United States Patent [19]

Watanuki et al.

[11] Patent Number: 4,827,193
[45] Date of Patent: May 2, 1989

[54] CORRECTING CIRCUIT OF PINCUSHION DISTORTION

[75] Inventors: Kiyoshi Watanuki; Yoichi Nakamura, both of Yokohama, Japan

[73] Assignee: Hitachi, Ltd., Tokyo, Japan

[21] Appl. No.: 46,143

[22] Filed: May 5, 1987

[30] Foreign Application Priority Data

May 7, 1986 [JP] Japan .................................. 61-103094
May 16, 1986 [JP] Japan .................................. 61-110751

[51] Int. Cl.⁴ .............................................. H01J 29/56
[52] U.S. Cl. ...................................................... 315/371
[58] Field of Search ................................. 315/370, 371

[56] References Cited

U.S. PATENT DOCUMENTS 3,944,879 3/1976 Suzuki .................................. 315/370
4,623,818 11/1986 Yamazaki ............................. 313/408
4,687,972 8/1987 Haferl .................................. 315/371

*Primary Examiner*—Theodore M. Blum
*Assistant Examiner*—Gregory C. Issing
*Attorney, Agent, or Firm*—Antonelli, Terry & Wands

[57] ABSTRACT

A terminal of the vertical deflection coil is connected to an integrating circuit, which generates a saw-tooth signal from the vertical deflection current for vertical synchronization. The saw-tooth signal is supplied to the clipping circuit having a diode so as to clip its waveform. The clipped signal and said parabolic signal are summed by an adding means in order to generate a correction signal. The correction signal is amplified with an amplifying transistors and supplied to the primary winding of the transformer, the secondary winding of which is serially connected to the horizontal deflection coil. The waveform of the signal that is summed up, is similar to the form of the pin cushion distortion indicated on the raster of a non-spherical CRT. Therefore, the correction singal modulates the amplitude of a current flowing through the horizontal deflection coil, so that the pin cushion distortion can be corrected on the luster.

5 Claims, 4 Drawing Sheets

CORRECTING CIRCUIT OF PINCUSHION DISTORTION

BACKGROUND OF THE INVENTION

The present invention relates to a correcting circuit of the spool-type distortion for displaying units that consists of image tubes, and more particularly to a correcting circuit of the spool-type distortion for television receivers having non-spherical surface of CRT fluorescent screens.

So far, such a CRT as shown in FIG. 5(a) has been used, the surface of which has a single curvature. But an image displayed with the CRT has side-pin cushion distortion that is shown with solid line "a" in FIG. 6. An example of the correcting circuit which removes such a distortion is described in U.S. Pat. No. 3,906,305.

FIG. 5(b) shows a horizontal cross-sectional view of a non-spherical CRT, the screen of which has a plurality of curvatures, and they are smaller in the center, than with respect to both side portions of the screen. In other words, the radius of curvature for the central portion or area of the screen is larger than with respect to that of the side portions of the screen. The image that is displayed with such a CRT, has a side-pin cushion distortion as shown in "b" in FIG. 6. On the same non-spherical surface of such a CRT, a side line has a distortion as shown with "d" in FIG. 6. This type of side line distortion can be corrected with the field of a magnet which is arranged near the deflecting yoke. The magnetic field certainly corrects the side line distortion, but the side-pin cushion distortion has a form of "c" in FIG. 6. The side-pin cushion distortion shown with "b" and "c" in FIG. 6 cannot be corrected with the spool-type distortion correcting circuit of the above U.S. Patent, because they are different from the distortion of "a" in the same figure.

SUMMARY OF THE INVENTION

It is an object of the invention to provide a correcting circuit of the spool-type distortion, for correcting the distortion generated in a CRT that has non-spherical surface.

The correcting circuit of the spool-type distortion according to the invention, consists of a parabolic signal generator which generates a voltage of parabolic waveform, a first amplifier to amplify said parabolic signals, clipping means to clip a part of said parabolic signals, a second amplifier to amplify the clipped parabolic signals, a distortion correcting signal generator which generates a distortion correcting signal by synthesizing the output signals of said first and second amplifiers and a modulator to modulate the horizontal deflection current by said distortion correcting signal.

As the distortion correcting signal is a synthesized signal of the parabolic signals having clipped and non-clipped waveforms, a similarity can be seen between the waveform of the distortion correcting signal and the form of the spool-type distortion displayed on the non-spherical CRT. A horizontal deflection current is amplitude-modulated with the correcting signal, so that the spool-type distortion can be corrected on the screen of the non-spherical CRT.

DESCRIPTION OF THE PREFERRED EMBODIMENTS

Figure 1:
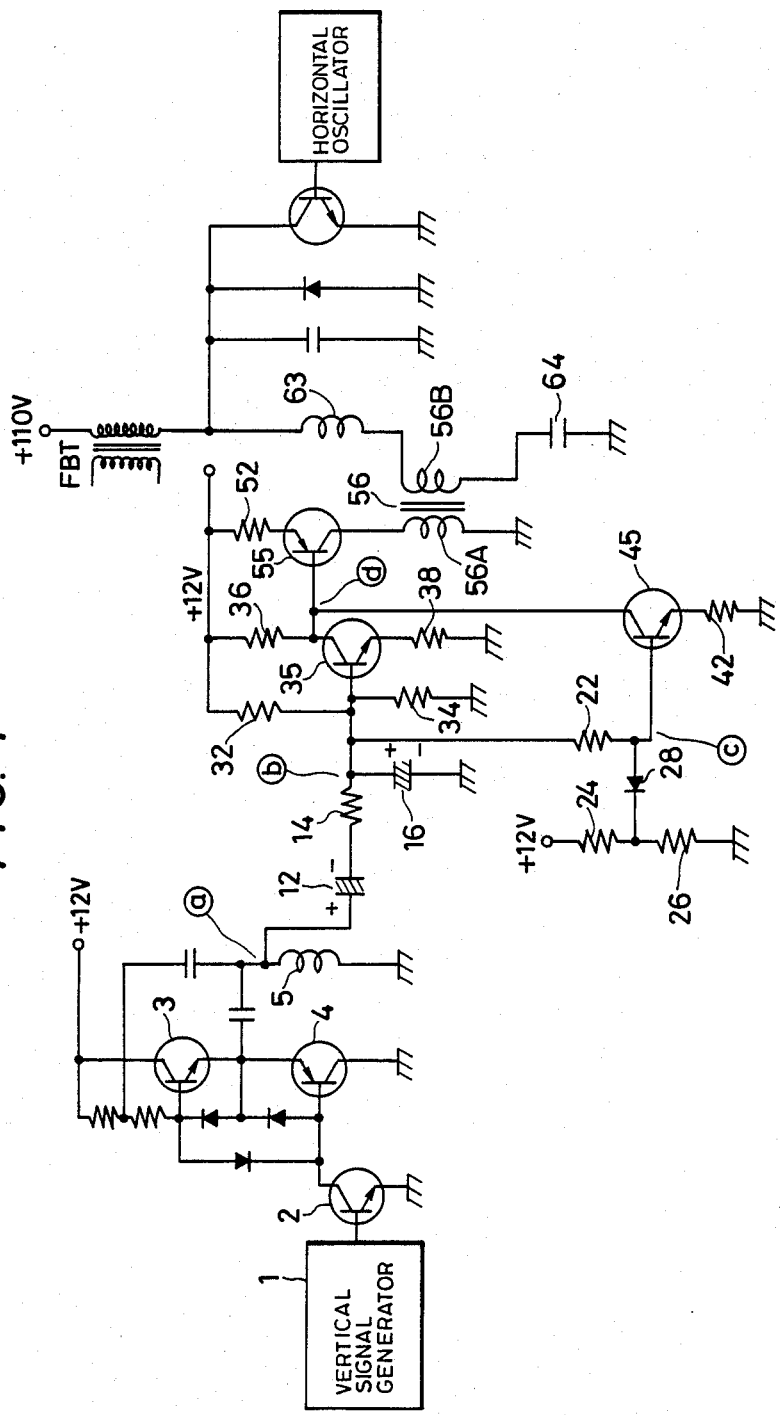
FIG. 1 is a circuit diagram illustrating an embodiment of the present invention.
Figure 3:
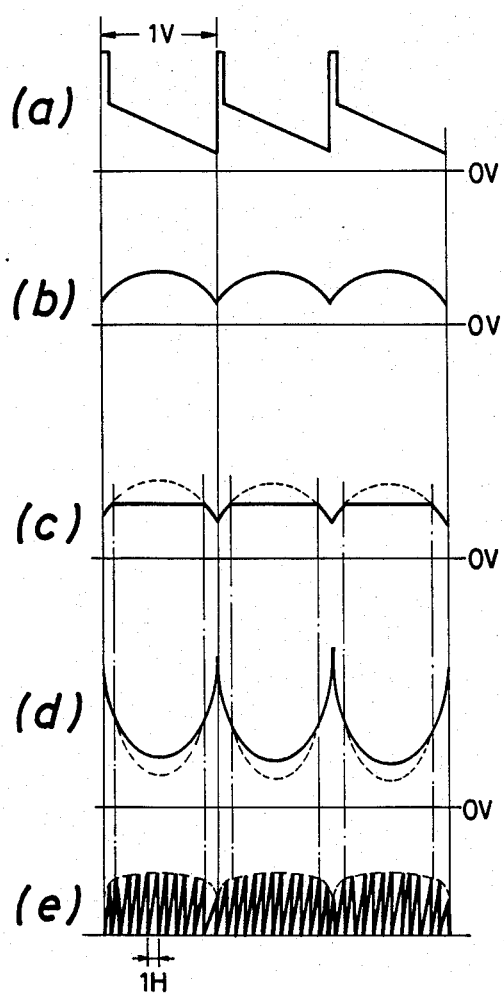
FIG. 3 illustrates signal waveforms generated from each part of the circuit in FIG. 1.

As shown in FIG. 1, vertical voltages having a saw-tooth waveform are generated from a vertical signal generator 1, and amplified with a vertical driving transistor 2 and vertical output transistors 3, 4, and then supplied to a vertical deflection coil 5 as a saw-tooth waveform current for vertical synchronization. The voltage of one end of the vertical deflection coil 5, illustrated in FIG. 3(a), after its direct-current part is removed by a capacitor 12, is integrated with the integration circuit consisting of a resistance 14 and a capacitor 16, and transformed into a parabolic voltage as shown in FIG. 3(b). The parabolic voltage is supplied to a transistor 35 for inverting and amplifying, and simultaneously supplied to a waveform shaping circuit consisting of a diode 28 and resistors 24, 26, where a part of the voltage is clipped, as illustrated in FIG. 3(c). The clipped parabolic voltage is supplied to a transistor 45 for inverting and amplifying. The output voltages of a transistor 35 and a transistor 45 are summed up, forming a distortion correcting signal as shown in FIG. 3(d), which is supplied to a transistor 55 and amplified. Output current of the transistor 55 is supplied to the primary winding 56A of a saturable transformer 56, so that the inductance of its secondary winding 56B changes. When the value of inductance changes in the secondary winding 56B of the transformer 56, the current flowing through horizontal deflection coil 63 is amplitude-modulated as shown in FIG. 3(e).

Figure 6:
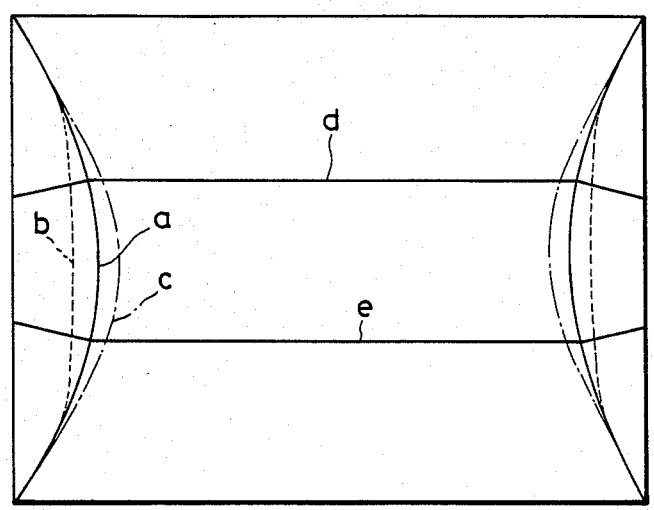
FIG. 6 is a front view of the side-pin cushion distortions generated on the screen of CRT.

With the change of the ratio of resistance values as to the resistors 24 and 26, the voltage level for effecting conduction of diode 28 is changed, altering the clipping level of the parabolic voltage and the waveforms of signals that are supplied to the transistor 45. And by changing the ratio of resistances 32, 34 and 22, it is possible to change the ratio of amplitudes of parabolic signals, one of which is inverted and supplied by the transistor 35, and the other of which is inverted and amplified by the transistor 45 such that, as shown in FIG. 3(d), the waveform of the added signal is changed. Therefore, by controlling the ratio of the above mentioned resistances 22, 24, 26, 32 and 34, it is possible to effect in a waveform of the horizontal deflection current as illustrated in FIG. 3(e), which is suitable for correcting the image distortion such as shown in FIG. 6 with respect to dashed line "b".

Figure 2:
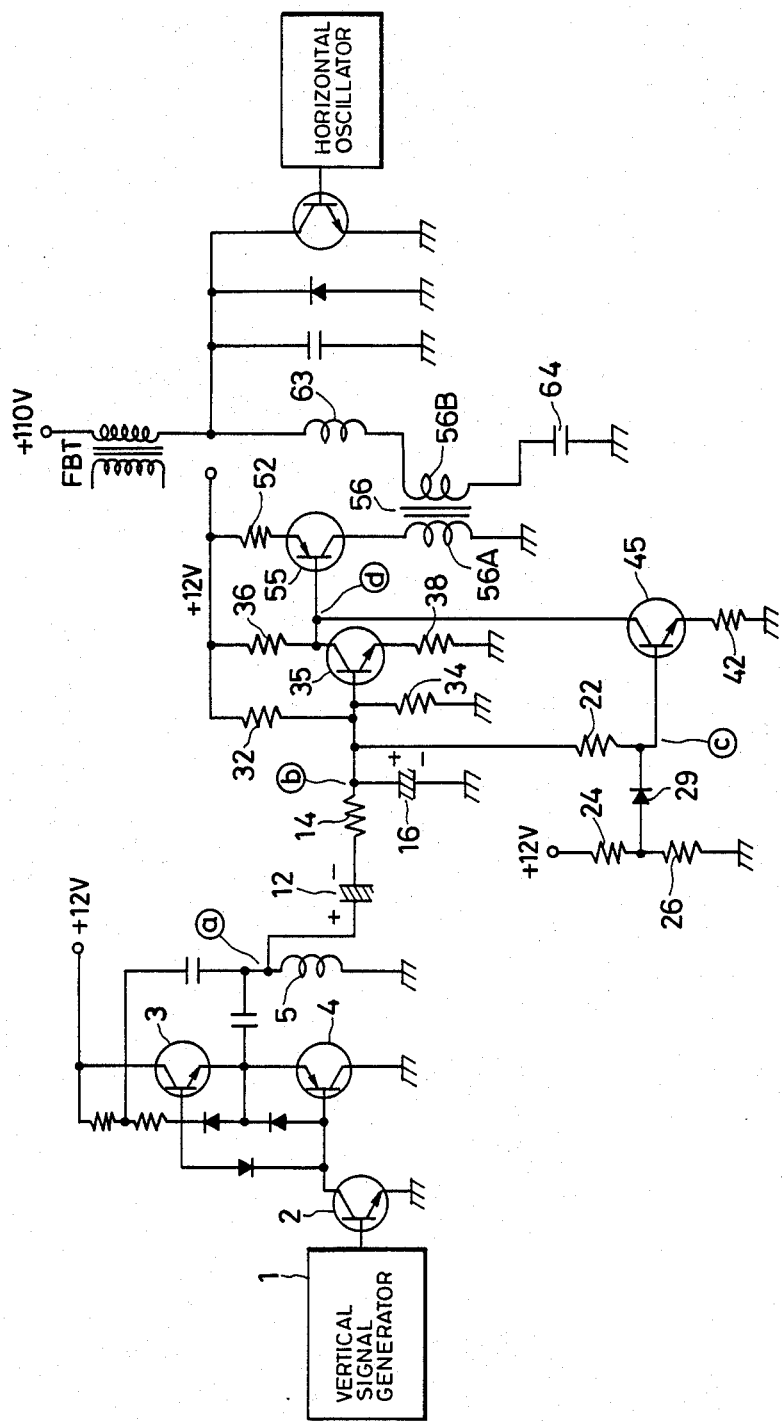
FIG. 2 is a circuit diagram illustrating another embodiment of the present invention.
Figure 5A:
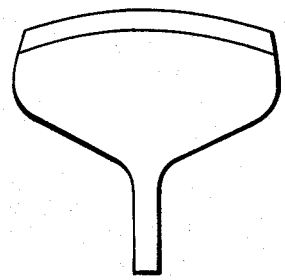
FIGS. 5(a) and 5(b) illustrate horizontal sectional views of CRT.
Figure 5B:
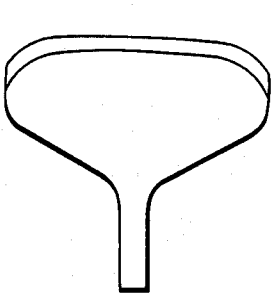
Figure 7:
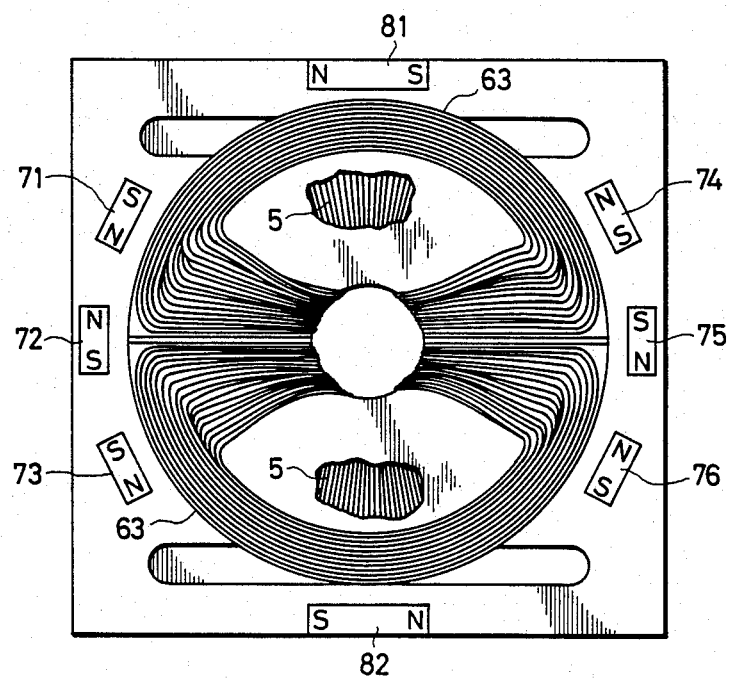
FIG. 7 is a rear view of the deflection coil and the magnets arranged around the coil.

FIG. 2 illustrates another embodiment of the invention. The side line distortion illustrated with "d" in FIG. 6 will be generated on the CRT screen which has a plurality of curvatures as shown in FIG. 5(b). Such a distortion can be generated when a side line curves toward the center of the CRT borders in CRTs having a small radius of curvature. Around the deflection coils, there are arranged magnets 71–76 in order to correct the side line distortion (referring now to FIG. 7). Magnets 81, 82 are arranged to compensate Gull Wing distortion which is generated at the upper and lower parts of the screen. A synthesized, magnetic field of magnets 71 and 72, gives to the electron beam a force directed upward, so as to compensate the side line distortion "d" that has been directed downward. On the other hand, a synthesized magnetic field of magnets 72 and 73, gives to the electron beam a force directed downward, so as to compensate the side line distortion "e" that has been directed upward. Magnets 74, 75 and 76 also correct the side line distortion in the same way. However, a part of the magnetic field generated from the magnets 72 and 75, will give to the electron beam a horizontal force directed toward the center of the screen; this leads to an increase of the side-pin cushion distortion in its central part, as illustrated with "c" in FIG. 6. The correcting circuit of the spool-type distortion, illustrated in FIG. 2, can correct such complex side-pin cushion distortion.

Figure 4:
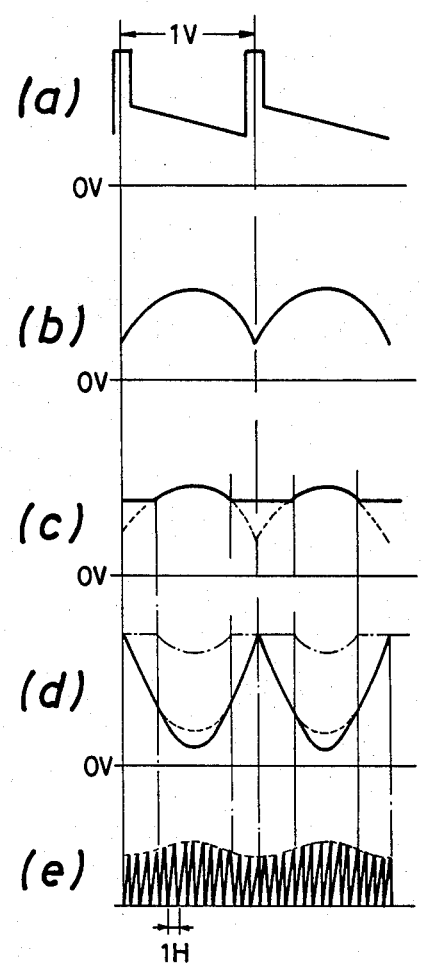
FIG. 4 illustrates signal waveforms generated from each part of the circuit in FIG. 2.

The voltage of the vertical saw-tooth waveform is generated from the vertical signal generator 1, and amplified with the vertical driving transistor 2 and the vertical output transistors 3, 4; and then supplied to the vertical deflection coil 5 as the saw-tooth current for vertical synchronization. The voltage generated from one end of the vertical deflection coil 5 and illustrated in FIG. 4(a), is filtered by condenser 12 to remove its direct current part, and integrated with the integration circuit that consists of resistance 14 and condenser 16 whereby it is transformed into the parabolic voltage, which is illustrated in FIG. 4(b). This parabolic voltage is supplied to transistor 35, and inverted and amplified therewith; the voltage is simultaneously supplied to the waveform shaping circuit consisting of diode 29 and resistances 24, 26, where a part of the parabolic voltage is clipped, as shown in FIG. 4(c), so as to keep its amplitudes constant not only at the beginning but at the end of the vertical scanning period. The clipped parabolic voltage is then supplied to transistor 45 for inverting and amplifying. The output voltage of transistors 35 and 45 are summed up to generate a distortion correcting voltage that is illustrated in FIG. 4(d) and then current-amplified with transistor 55. The output current of transistors 55 is supplied to the primary winding 56A of saturable transformer 56 so as to change the inductance value of the secondary winding 56B of the transformer. This change of the inductance value leads to an amplitude-modulation of the horizontal deflection current flowing through the horizontal deflection coil 63, as illustrated in FIG. 4(e).

The ratio of resistances 24, 26 can be changed so as to alter the voltage at which diode 28 becomes conductive. This results in an alteration of the clipped, voltage waveform as illustrated in FIG. 4(c). Moreover, an alteration of the ratio of the resistances 32, 34, 22 results in a change of the amplitude-ratio of the parabolic voltage that is inverted and amplified with transistor 35 to the voltage that is clipped before inversion and amplification. This leads to a change in the waveform of the distortion correcting voltage as shown in FIG. 4(d). Therefore, by controlling the ratio of the resistances 22, 24, 26 and 34, the waveform of the horizontal deflection current illustrated in FIG. 4(e), can be made suitable to correct the image distortion that is shown with respect to "c" in FIG. 6.

According to the present invention, it is possible to correct the side-pin cushion distortion of complex form which is generated by a CRT having a fluorescent screen of non-spherical form. Furthermore, it is possible to correct complex types of side-pin cushion distortions, which are generated under the influence of the magnets of common-type CRTs.

We claim:

1. A correcting circuit for overcoming pincushion distortion generated on a CRT screen which has a plurality of curvatures in the horizontal direction, including a first main screen curvature corresponding to a centrally located area on the screen and at least a second screen curvature corresponding to a circumferential outer area on both sides of the CRT screen inside the CRT screen periphery, comprising:
   a horizontal deflection coil;
   horizontal deflection means for supplying horizontal deflection signals to said horizontal deflection coil;
   a vertical deflection coil;
   vertical deflection means for supplying vertical deflection signals to said vertical deflection coil;
   a plurality of magnets being disposed near the deflecting yoke which mounts said horizontal deflection coil and said vertical deflection coil in order to correct sideline distortion;
   a parabolic signal generator for producing parabolic signals in response to said vertical deflection signals;
   waveform shaping means, coupled to said parabolic signal generator, which shapes the waveform of said parabolic signals to effect in a constant amplitude voltage thereof during the scanning period beginning at the point of changing from said first to said second curvature of the CRT screen;
   adding means for generating distortion correcting signals by summing up said parabolic signals and said waveform-shaped parabolic signals;
   modulating means, coupled to said horizontal deflection coil and to said adding means, for amplitude-modulating said horizontal deflection signals which are supplied to said horizontal deflection coil in accordance with said distortion correction signals.

2. A circuit according to claim 1, wherein said waveform shaping means includes a D.C. voltage source and a diode, the anode of which being connected to said voltage source and the cathode being coupled to receive said parabolic signal for effecting thereat said constant amplitude voltage.

3. A circuit according to claim 2, wherein said waveform shaping means further includes a voltage divider coupled across said D.C. voltage source and having a voltage divider terminal coupled to said anode, and transistor means, being coupled between said cathode and said adder means, for amplifying and inverting said cathode signal level.

4. A correcting circuit of pincushion distortion generated on a CRT screen having a plurality of curvatures in the horizontal directions, including a first main screen curvature at a centrally located area on the screen and a second screen curvature corresponding to an area near the periphery on both sides of the CRT screen, comprising:
   a horizontal deflection coil;
   horizontal deflection means for supplying horizontal deflection signals to said horizontal deflection coil;
   a vertical deflection coil;
   vertical deflection means for supplying vertical deflection signals to said vertical deflection coil;

a plurality of magnets being disposed near the deflecting yoke which mounts said horizontal deflection coil and said vertical deflection coil in order to correct sideline distortion resulting from a change in curvature on the CRT screen;

a parabolic signal generator for converting said vertical deflection signals into parabolic signals;

waveform shaping means, coupled to said parabolic signal generator, including a constant voltage source and a diode, the anode of which being coupled to said voltage source and the cathode being coupled to receive said parabolic signals for effecting signal clipping thereat so as to effect in a constant amplitude voltage thereof during the scanning period beginning at the point of changing from said first to said second curvature of the CRT screen;

amplifier means for amplifying said parabolic signals;

adding means, coupled to respective outputs of said amplifying means and said waveform shaping means, for generating distortion correcting signals by summing up the parabolic signals from said parabolic signal generator and the clipped signals from said waveform shaping means; and modulating means, coupled to said horizontal deflection coil and to said adding means, for amplitude-modulating said horizontal deflection signals which flow through said horizontal deflection coil in response to said distortion correcting signals.

5. A circuit according to claim 4, wherein said waveform shaping means further includes a voltage divider coupled across a D.C. voltage source and having a voltage divider bias terminal coupled to said anode, and transistor means, being coupled between said cathode and said adder means, for inverting and amplifying said clipped anode signals.

* * * * *